(12) United States Patent
Chen

(10) Patent No.: US 10,187,947 B2
(45) Date of Patent: *Jan. 22, 2019

(54) LIFE-STYLE LED SECURITY LIGHT

(71) Applicant: Chia-Teh Chen, Taipei (TW)

(72) Inventor: Chia-Teh Chen, Taipei (TW)

(*) Notice: Subject to any disclaimer, the term of this patent is extended or adjusted under 35 U.S.C. 154(b) by 13 days.

This patent is subject to a terminal disclaimer.

(21) Appl. No.: 15/856,468

(22) Filed: Dec. 28, 2017

(65) Prior Publication Data

US 2018/0124893 A1     May 3, 2018

Related U.S. Application Data

(63) Continuation of application No. 15/637,175, filed on Jun. 29, 2017, which is a continuation of application
(Continued)

(51) Int. Cl.
*H05B 37/02* (2006.01)
*H05B 33/08* (2006.01)
(Continued)

(52) U.S. Cl.
CPC ............ *H05B 33/0854* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H02J 7/35* (2013.01); *H05B 33/083* (2013.01); *H05B 33/0809* (2013.01); *H05B 33/0815* (2013.01); *H05B 33/0818* (2013.01); *H05B 33/0824* (2013.01); *H05B 33/0827* (2013.01); *H05B 33/0872* (2013.01); *H05B 37/02* (2013.01); *H05B 37/0218* (2013.01); *H05B 37/0227* (2013.01); *H05B 37/0281* (2013.01); *H05B 39/042* (2013.01); *H05B 39/044* (2013.01); *F21Y 2115/10* (2016.08);
(Continued)

(58) Field of Classification Search
CPC ............ H05B 33/0815; H05B 33/0845; H05B 33/0848; H05B 37/0218; H05B 37/0227; H05B 37/0281
USPC ................ 315/149, 152, 154, 307, 308, 312
See application file for complete search history.

(56) References Cited

U.S. PATENT DOCUMENTS 5,442,177 A    8/1995  Boulos et al.
5,548,967 A    8/1996  Ghiraldi
(Continued)

*Primary Examiner* — Tung X Le
(74) *Attorney, Agent, or Firm* — Rosenberg, Klein & Lee

(57) ABSTRACT

A two-level LED security light within it has a light-emitting unit including an LED load which may be turned on or turned off by a loading and power control unit activated by a light sensing control unit and a motion sensing unit. When the motion sensing unit detects a motion signal, the light-emitting unit is switched to a high level illumination for a predetermined time length adjustable by a time setting unit, and then the loading and power control unit manages to turn off the light-emitting unit thru a soft off process. The LED load is configured with a plurality of LEDs accommodating to the power supply unit wherein a voltage V across each LED is confined in a range $V_{th}<V<V_{max}$, with $V_{th}$ being a minimum voltage to turn on the LED and $V_{max}$ a maximum voltage to avoid damaging the LED.

61 Claims, 16 Drawing Sheets

Related U.S. Application Data

No. 15/230,752, filed on Aug. 8, 2016, now Pat. No. 9,743,480, which is a continuation of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | | |
|---|---|---|
| G08B 15/00 | (2006.01) | |
| H05B 39/04 | (2006.01) | |
| F21S 9/03 | (2006.01) | |
| F21V 17/02 | (2006.01) | |
| G08B 5/36 | (2006.01) | |
| H02J 7/35 | (2006.01) | |
| G08B 13/189 | (2006.01) | |
| F21Y 115/10 | (2016.01) | |
| G08B 13/00 | (2006.01) | |

(52) U.S. Cl.
CPC ............ G08B 13/00 (2013.01); G08B 13/189 (2013.01); Y02B 20/40 (2013.01); Y02B 20/44 (2013.01); Y02B 20/46 (2013.01)

(56) References Cited

U.S. PATENT DOCUMENTS

| | | |
|---|---|---|
| 5,598,066 A | 1/1997 | Wiesemann et al. |
| 5,699,243 A | 12/1997 | Eckel et al. |
| 5,747,937 A | 5/1998 | Wiesemann et al. |
| 5,946,209 A | 8/1999 | Eckel et al. |
| 6,225,748 B1 | 5/2001 | Evans et al. |
| 6,586,890 B2 | 7/2003 | Min et al. |
| 6,820,998 B2 | 11/2004 | Chen |
| 6,888,323 B1 | 5/2005 | Null et al. |
| 6,909,239 B2 | 6/2005 | Gauna |
| 6,927,541 B2 | 8/2005 | Lee |
| 7,038,399 B2 | 5/2006 | Lys et al. |
| 7,081,715 B1 | 7/2006 | Goldstein |
| 7,190,125 B2 | 3/2007 | McDonough et al. |
| 7,268,497 B2 | 9/2007 | Hsieh |
| 7,271,543 B1 | 9/2007 | Goldstein |
| 7,339,471 B1 | 3/2008 | Chan et al. |
| 7,344,275 B2 | 3/2008 | Allen et al. |
| 7,405,524 B2 | 7/2008 | Null et al. |
| 7,586,271 B2 | 9/2009 | Shuy |
| 7,804,252 B2 | 9/2010 | Chen |
| 8,035,513 B2 | 10/2011 | Raper |
| 8,194,061 B2 | 6/2012 | Wang et al. |
| 8,310,163 B2 | 11/2012 | Chen |
| 8,461,778 B2 | 6/2013 | Mohan et al. |
| 8,598,805 B2 | 12/2013 | Tremblay et al. |
| 8,680,789 B2 | 3/2014 | Mohan et al. |
| 8,901,825 B2 | 12/2014 | Reed |
| 9,035,769 B2 | 5/2015 | Steiner et al. |
| 9,271,345 B2 | 2/2016 | Welten |
| 9,480,129 B2 | 10/2016 | Chen |
| 9,596,735 B2 | 3/2017 | Chen |
| 2006/0022916 A1 | 2/2006 | Aiello |
| 2007/0182338 A1 | 8/2007 | Shteynberg et al. |
| 2008/0258647 A1* | 10/2008 | Scianna ............ H05B 33/0815 315/291 |
| 2008/0278934 A1 | 11/2008 | Maldonado |
| 2009/0316392 A1* | 12/2009 | Chou .................. H02J 7/35 362/183 |
| 2010/0171442 A1* | 7/2010 | Draper ............... H05B 33/0869 315/297 |
| 2010/0277089 A1 | 11/2010 | Chien |
| 2011/0043133 A1 | 2/2011 | Van Laanen et al. |
| 2012/0112667 A1 | 5/2012 | Mohan et al. |
| 2012/0206051 A1 | 8/2012 | Nieuwlands |
| 2012/0262069 A1 | 10/2012 | Reed |

\* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

LIFE-STYLE LED SECURITY LIGHT

CROSS-REFERENCE TO RELATED APPLICATIONS

This is a continuation application of prior application Ser. No. 15/637,175 filed on Jun. 29, 2017, currently pending, which is a continuation application of prior application Ser. No. 15/230,752 filed on Aug. 8, 2016, issued as U.S. Pat. No. 9,743,480 on Aug. 22, 2017, which is a continuation application of prior application Ser. No. 14/478,150 filed on Sep. 5, 2014, issued as U.S. Pat. No. 9,445,474 on Sep. 13, 2016, which is a continuation application of prior application Ser. No. 13/222,090 filed on Aug. 31, 2011, issued as U.S. Pat. No. 8,866,392 on Oct. 21, 2014.

BACKGROUND

1. Technical Field

The present disclosure relates to a lighting apparatus, in particular, to a two-level security LED light with motion sensor.

2. Description of Related Art

Lighting sources such as the fluorescent lamps, the incandescent lamps, the halogen lamps, and the light-emitting diodes (LED) are commonly found in lighting apparatuses for illumination purpose. Photo resistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that an ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that an ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes one or a plurality of parallel-connected alternating current (AC) LEDs. A phase controller is coupled between the described one or a plurality parallel-connected ACLEDs and AC power source. The loading and power control unit may through the phase controller control the average power of the light-emitting unit; when the light sensing control unit detects that an ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that an ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that an ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto turn off at dawn. The PC mode may generate a high level illumination for a predetermined duration then automatically switch to the PS mode by a control unit to generate a low level illumination. When the motion sensor detects a human motion, the disclosed LED security light may immediately switch to the high level illumination for a short predetermined duration thereby achieve illumination or warning effect. After the short predetermined duration, the LED security light may automatically return to the low level illumination for saving energy. The PC mode may alternatively generate the low level illumination to begin with and when the motion sensor is detected the disclosed LED security may immediately switch to a high level illumination for a short predetermined duration to provide security protection and then automatically return to the low level illumination.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers.

DESCRIPTION OF THE EXEMPLARY EMBODIMENTS

Figure 1:
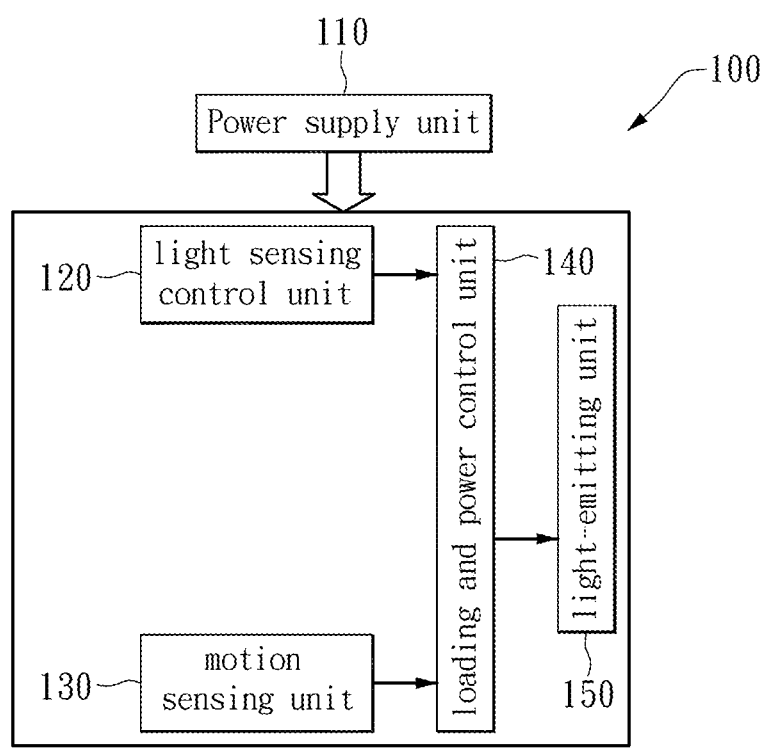
FIG. 1 schematically illustrates a block diagram of a two-level LED security light in accordance with an exemplary embodiment of the present disclosure.
Figure 1A:
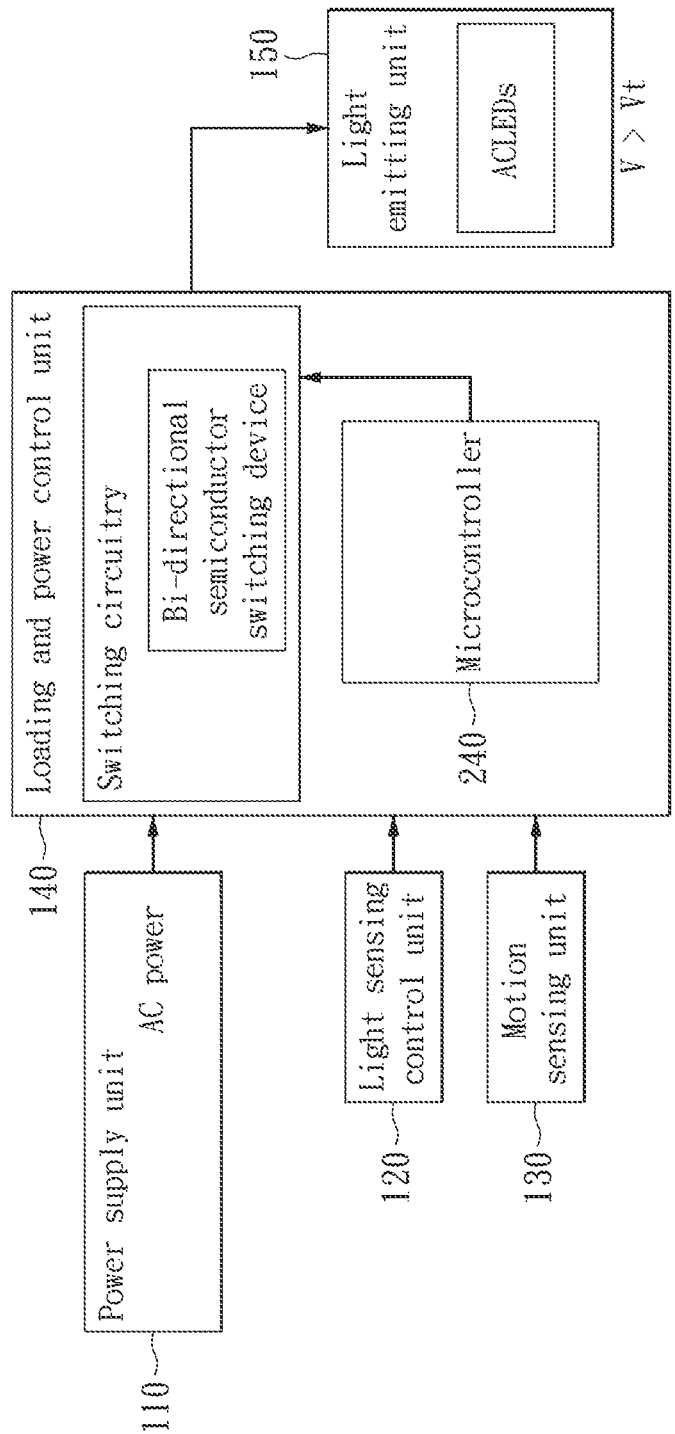
FIG. 1A is an enhanced block diagrammed under FIG. 1 to specifically illustrate an embodiment of FIG. 1 for an ACLED two-level security light, wherein the loading and power comprises a switching circuitry and a microcontroller, wherein the switching circuitry further comprises a bidirectional semiconductor switching device for controlling an average electric power to be delivered to the ACLED.
Figure 1B:
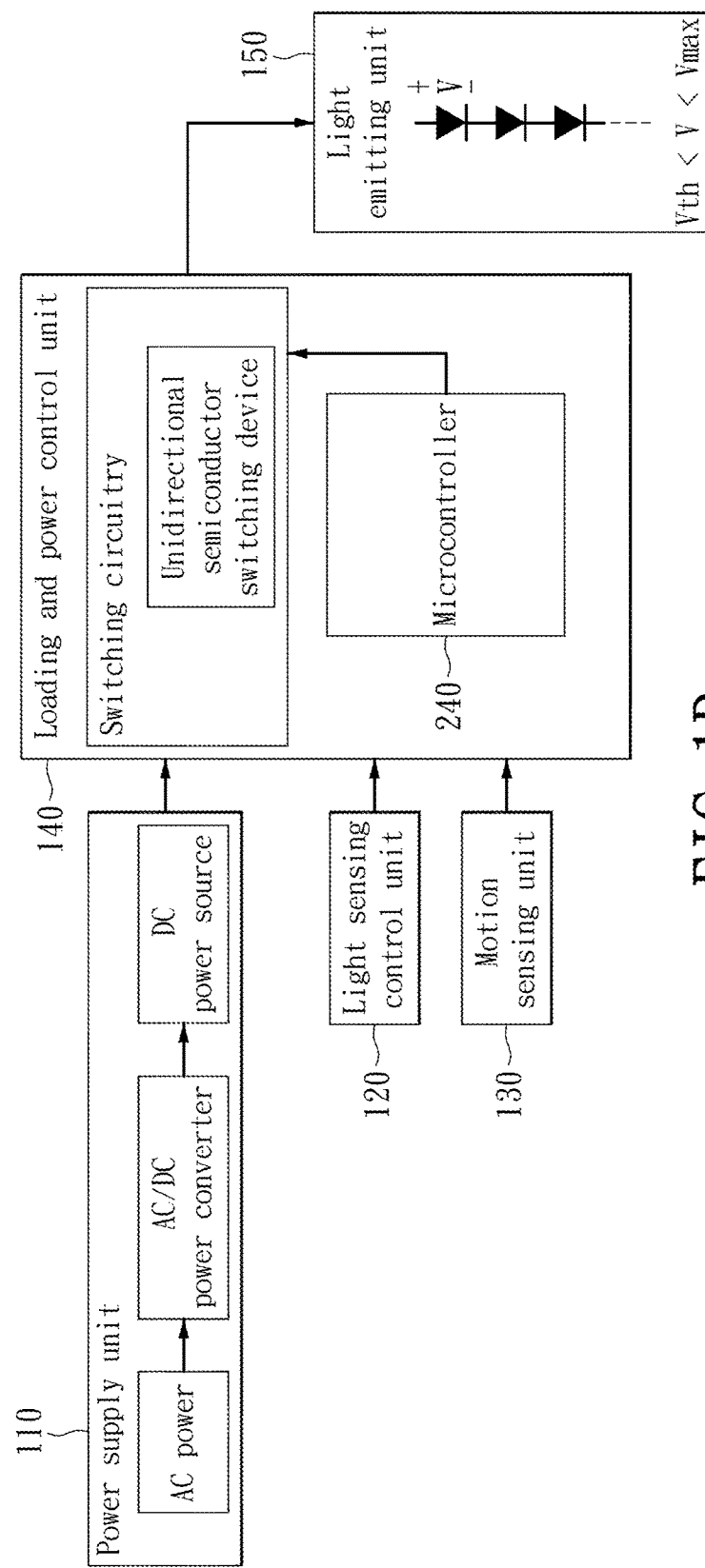
FIG. 1B is an enhanced block diagrammed under FIG. 1 to specifically illustrate an embodiment of FIG. 1 for a DC LED two level security light, wherein the loading and power control unit comprises a switching circuitry and a microcontroller, wherein the switching circuitry further comprises an unidirectional semiconductor switching device for controlling an average electric power to be delivered to the DC LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller electrically coupled with a switching circuitry electrically connected between the light emitting unit 150 and the power supply unit 110. The switching circuitry may comprise a plurality of semiconductor switching components. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs. The loading and power control unit 140 may control the light-emitting unit 150 to generate at least two levels of illumination variations.

When the light sensing control unit 120 detects that an ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode or it may alternatively generate the low level illumination to perform the power saving mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flows through the light-emitting unit 150, to generate another high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240 electrically coupled to a switching circuitry Q1. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a control signal like a pulse width modulation (PWM) signal to control an average electric current delivered to the light emitting unit 250. It is worth to note that the electric components depicted in FIG. 2A only serves as an illustration for the exemplary embodiment of the present disclose and hence the present disclosure is not limited thereto.

Figure 2A:
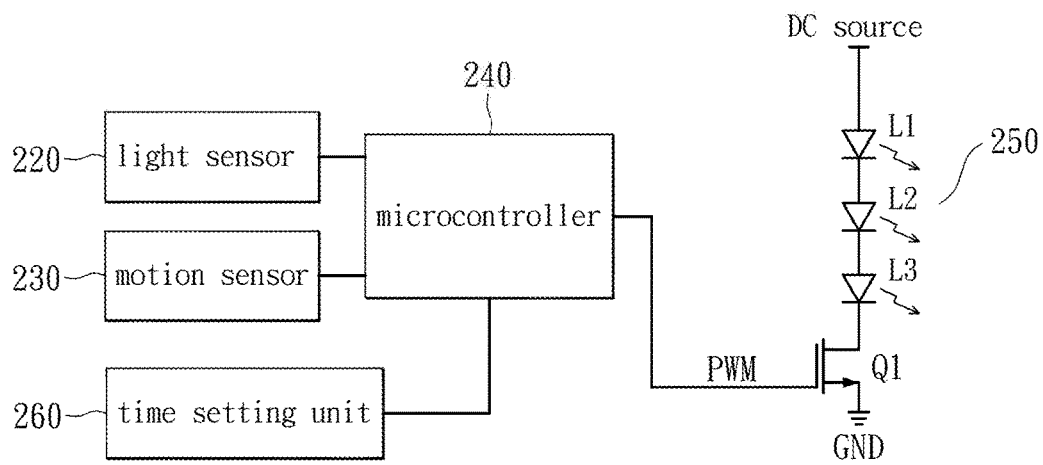
FIG. 2A illustrates a schematic diagram of a two-level LED security light in accordance to the first exemplary embodiment of the present disclosure.
Figure 2B:
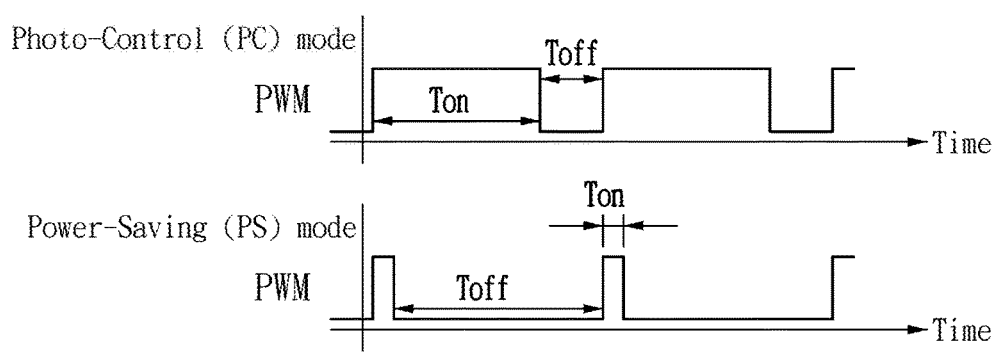
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow a user to configure the predetermined duration associated with the high level illumination in the PC mode, however the present disclosure is not limited thereto. The time setting unit 260 may also be used for setting a predetermined time duration associated with the low level illumination as well as a predetermined time duration associated with a motion activated high level illumination. The time setting unit 260 is typically configured with an analogue circuitry comprising a resister and a capacitor for setting a time length. However, if precision of time length is crucial or much preferred, a digital circuitry may be employed, wherein a voltage divider with a variable resister coupled to the microcontroller designed with a time setting subroutine or a push button device coupled with a grounding pin of the microcontroller designed with the time setting subroutine for more precisely setting a time length for performing an illumination mode.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
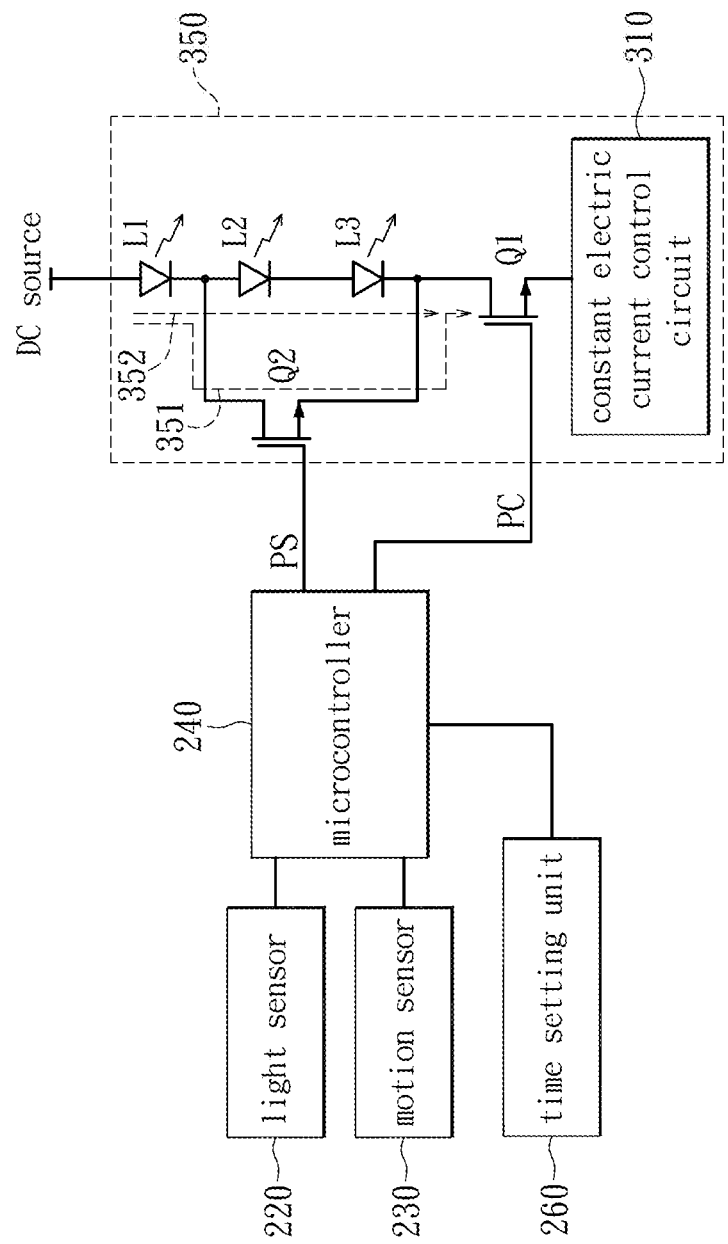
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 determines that an ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
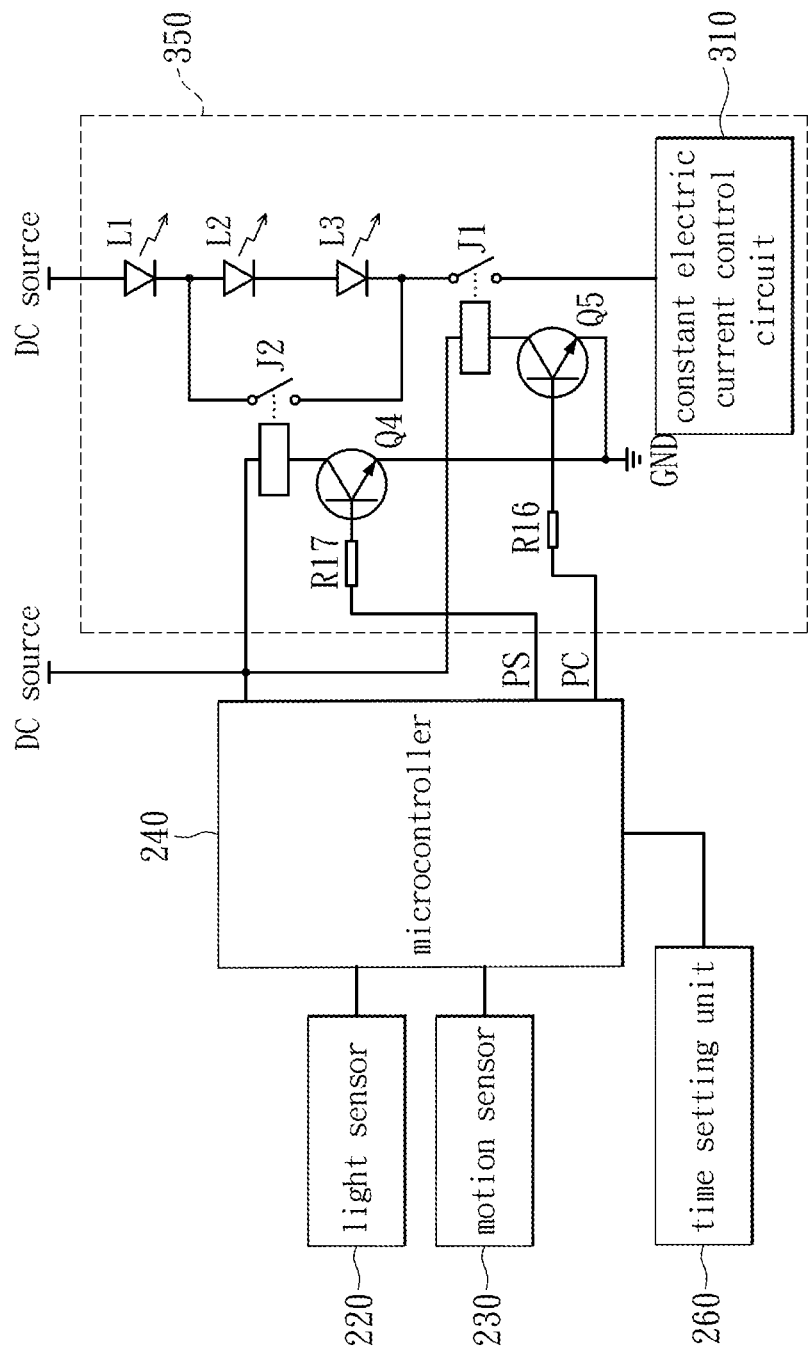
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may be connected to a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include one or more parallel-connected alternating current (AC) LEDs. A phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
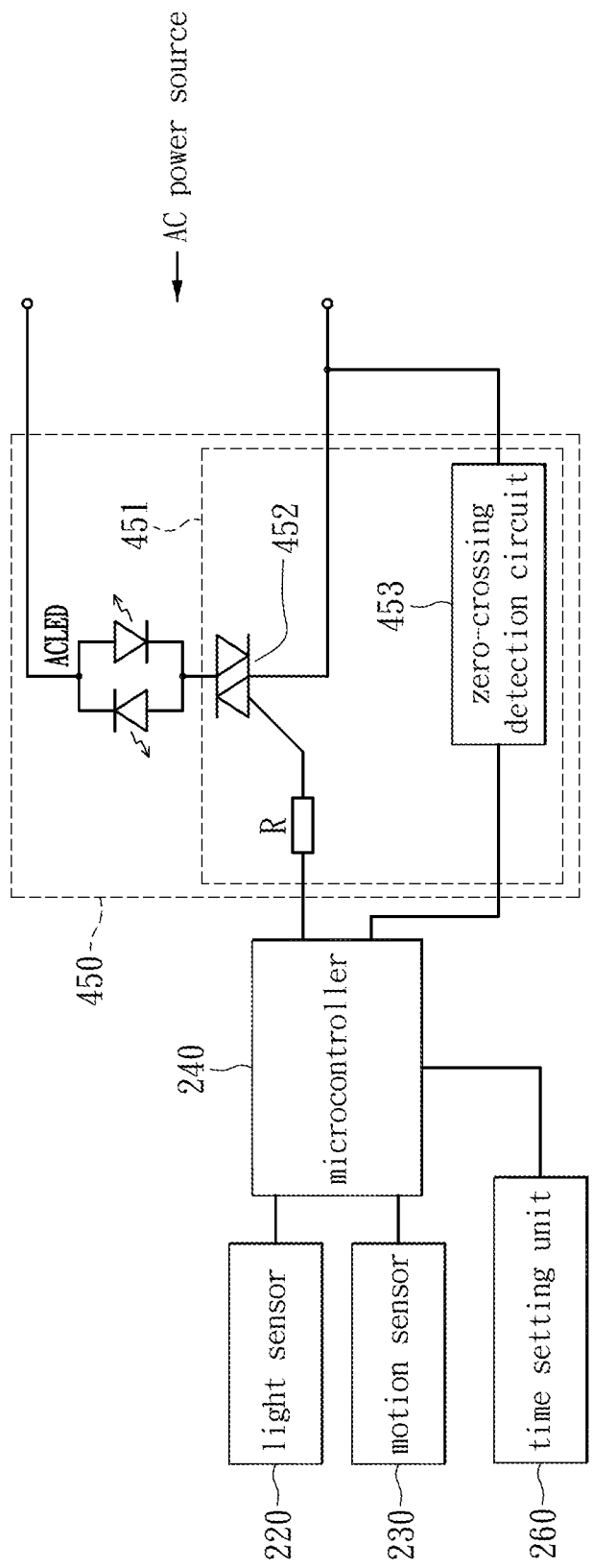
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 is connected to a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2f} - t_o$ for a light-source load with a cut-in voltage $V_t$, wherein $t_o = (1/2\pi f) \sin^{-1}(V_t/V_m)$. The described criterion is applicable to all types of ACLEDs to assure that the triac 452 can be stably triggered in both positive and negative half cycle of the AC power source. Take ACLED with $V_t(rms)=80V$ as an example, and supposing the $V_m(rms)=110V$ and $f=60$ Hz, then $t_o=2.2$ ms and $(1/2f)=8.3$ ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$, <6.1 ms.

Figure 4B:
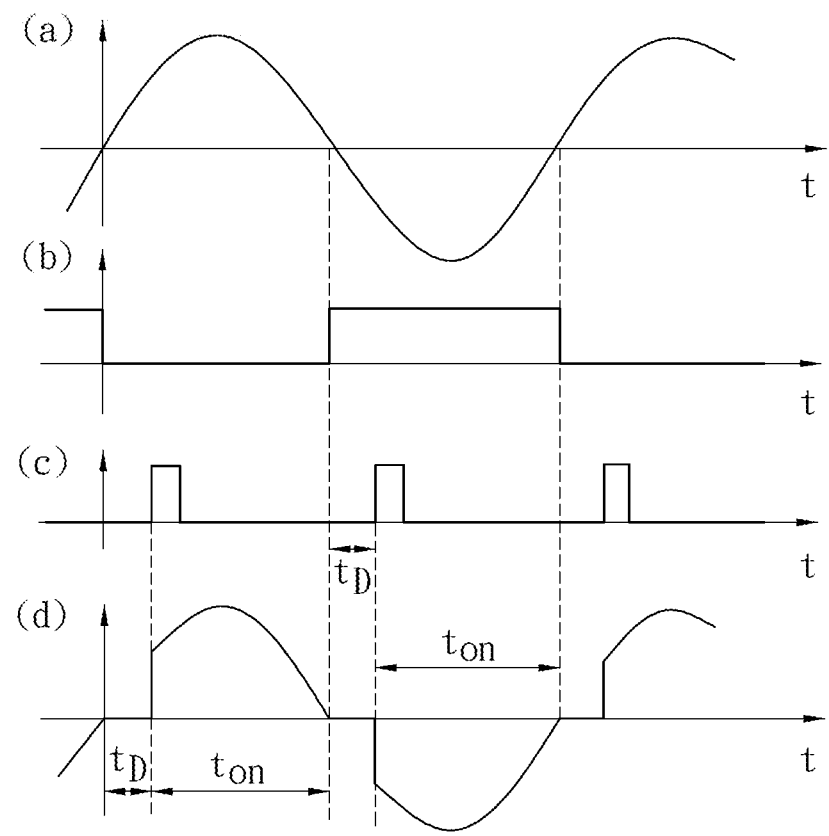
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
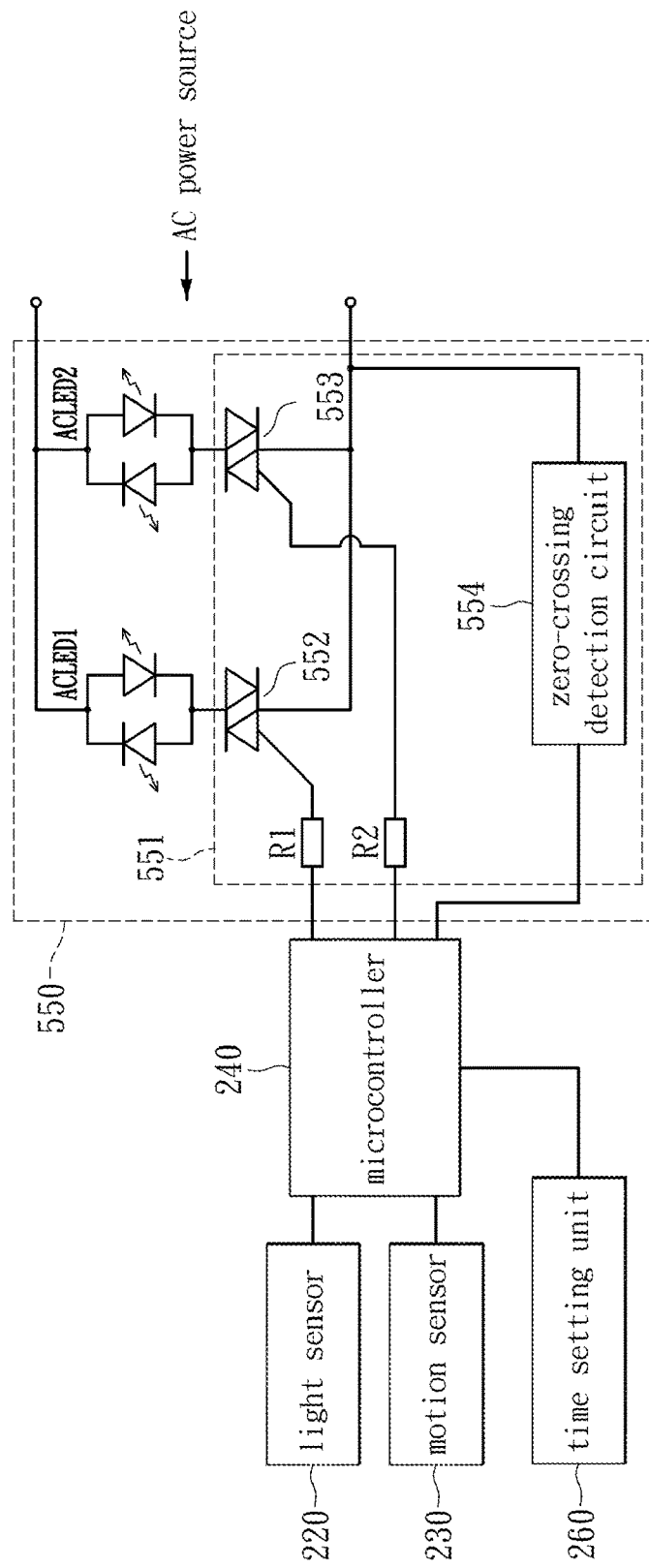
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLED and more than one bi-directional switching device. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
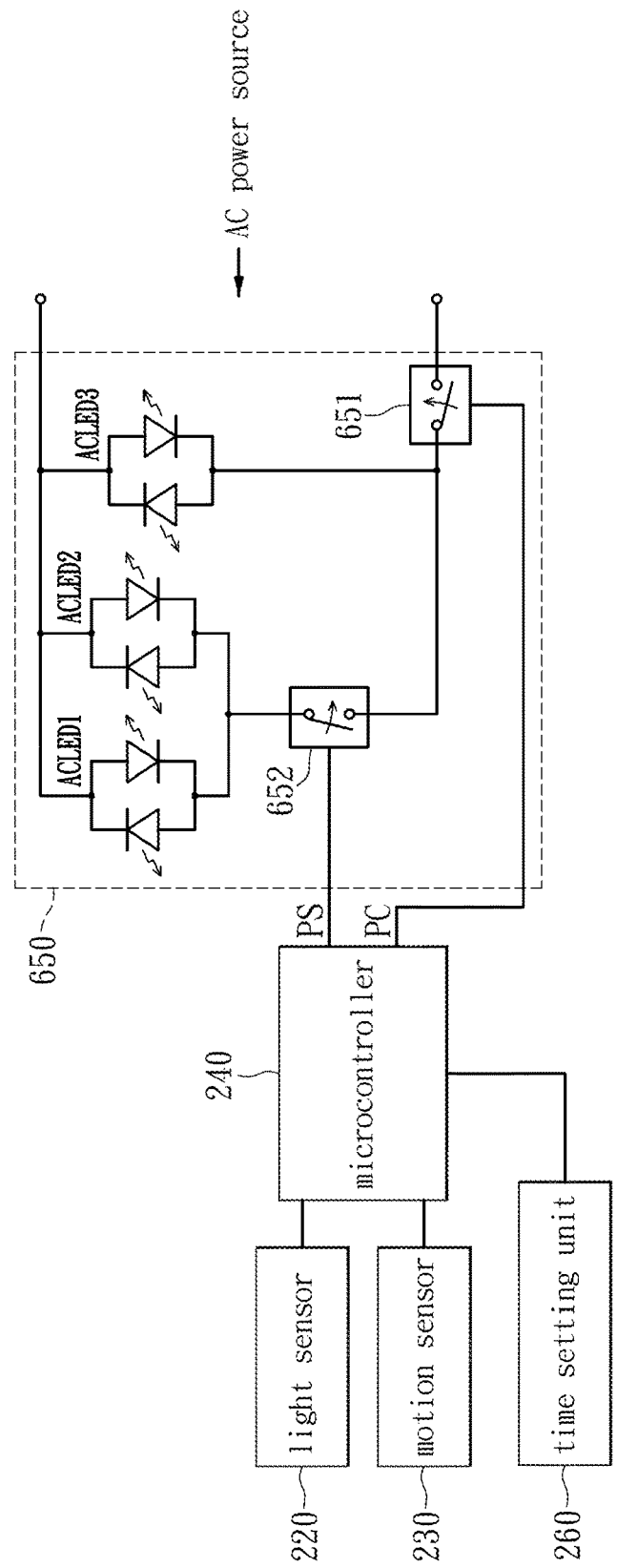
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power electrically connected to switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

Fifth Exemplary Embodiment

Figure 7:
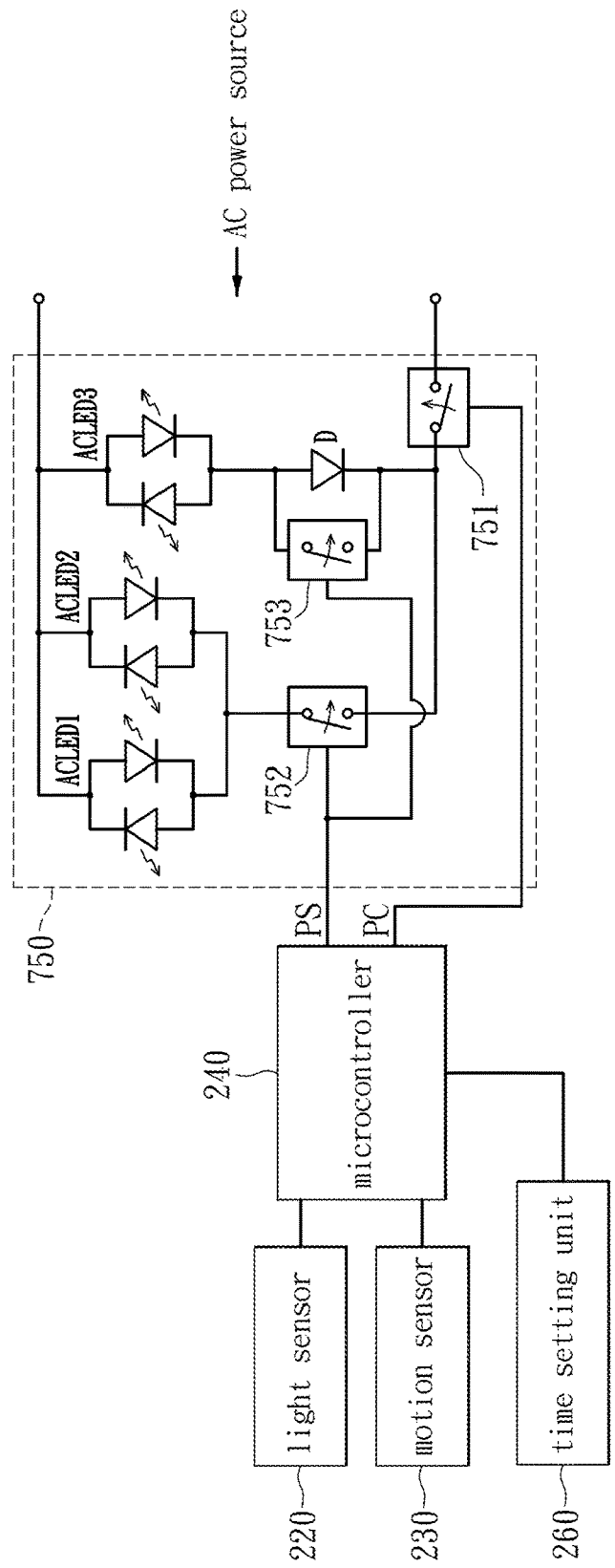
FIG. 7 illustrates a schematic diagram of a two-level LED security light in accordance to the fifth exemplary embodiment of the present disclosure.
Figure 8A:
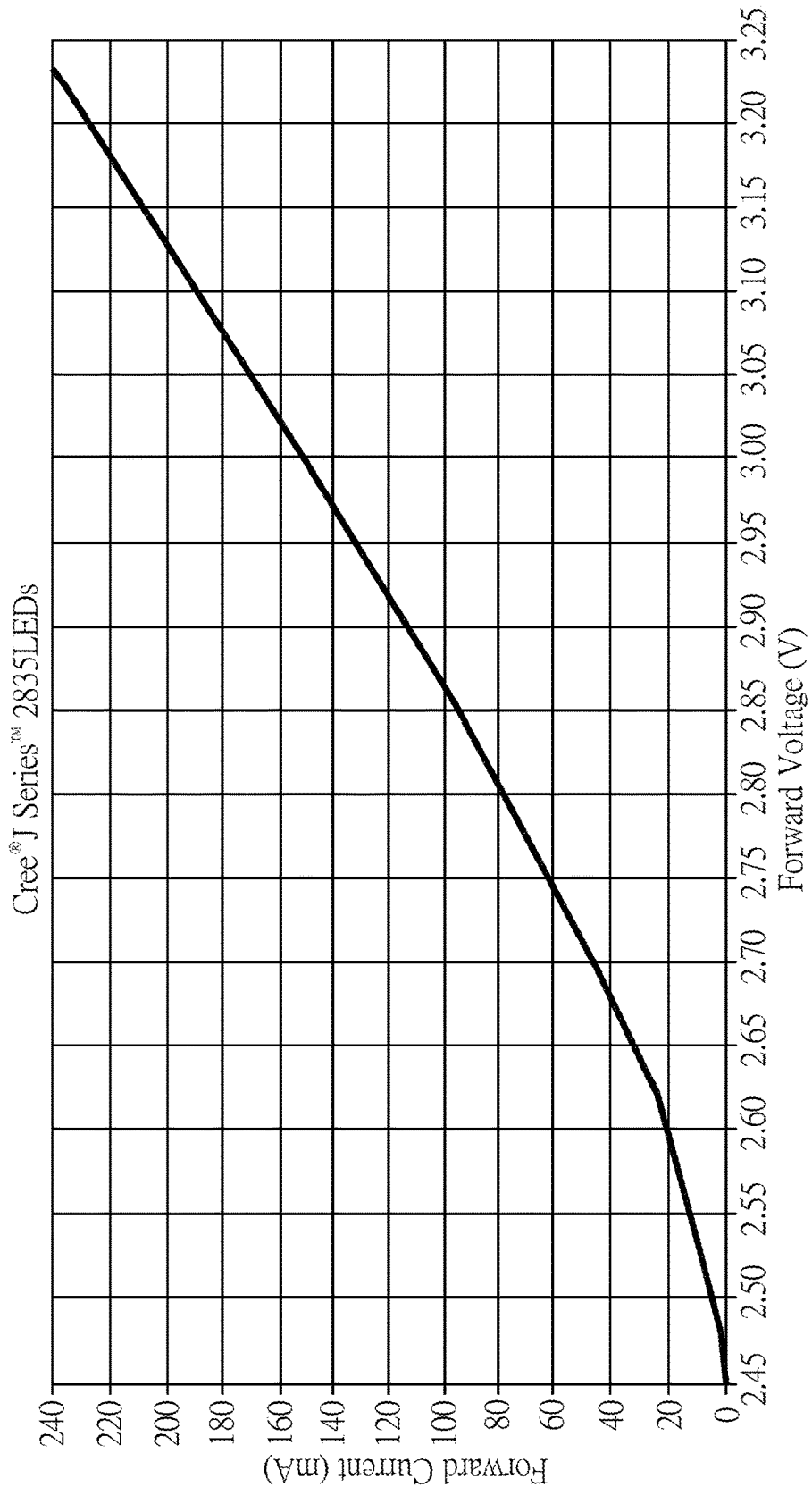
FIGS. 8A, 8B, 8C, and 8D schematically and respectively show V-I relationship charts (Forward Current vs. Forward Voltage) for a white LED chip from each of 4 different LED manufacturers.
Figure 8B:
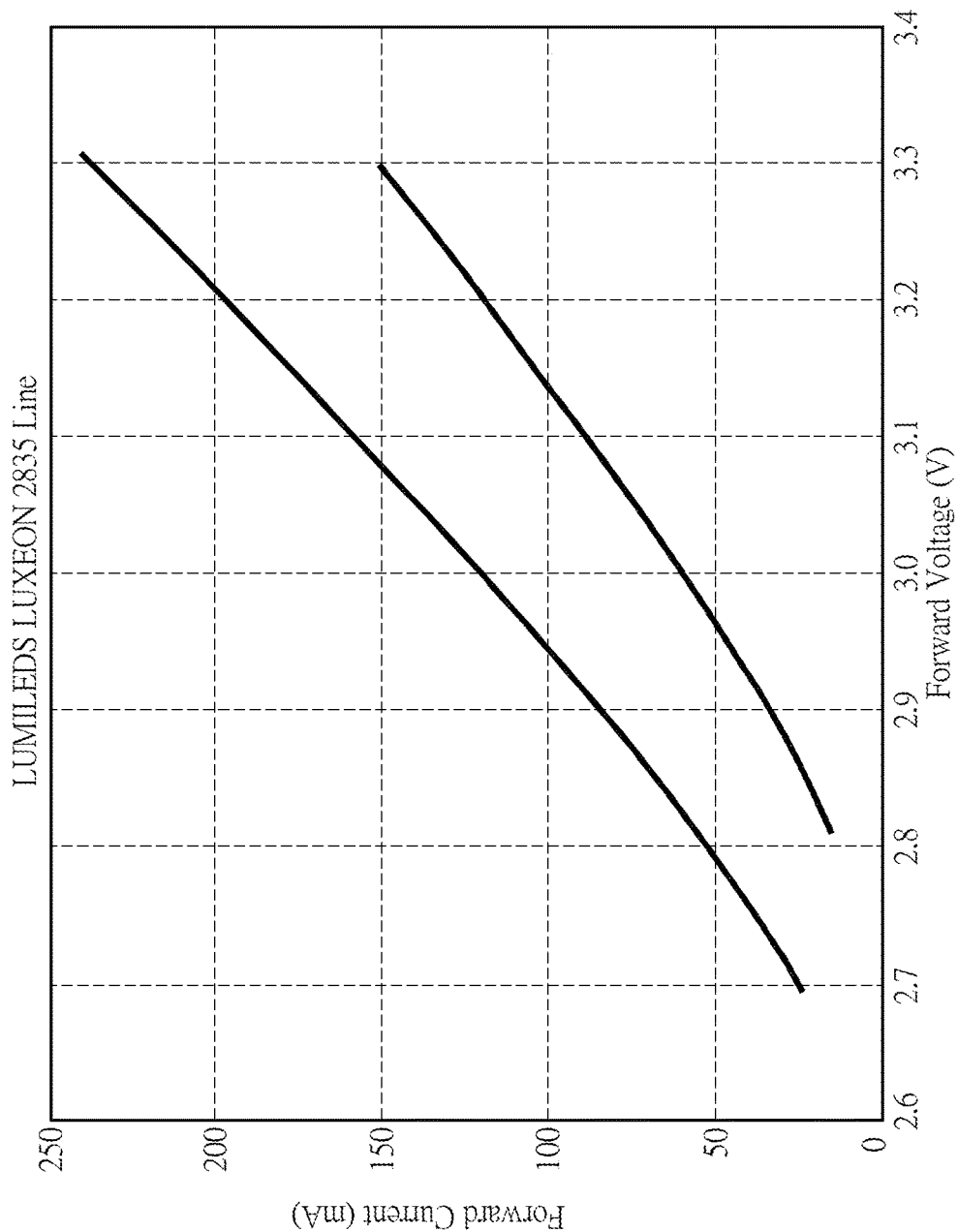
Figure 8C:
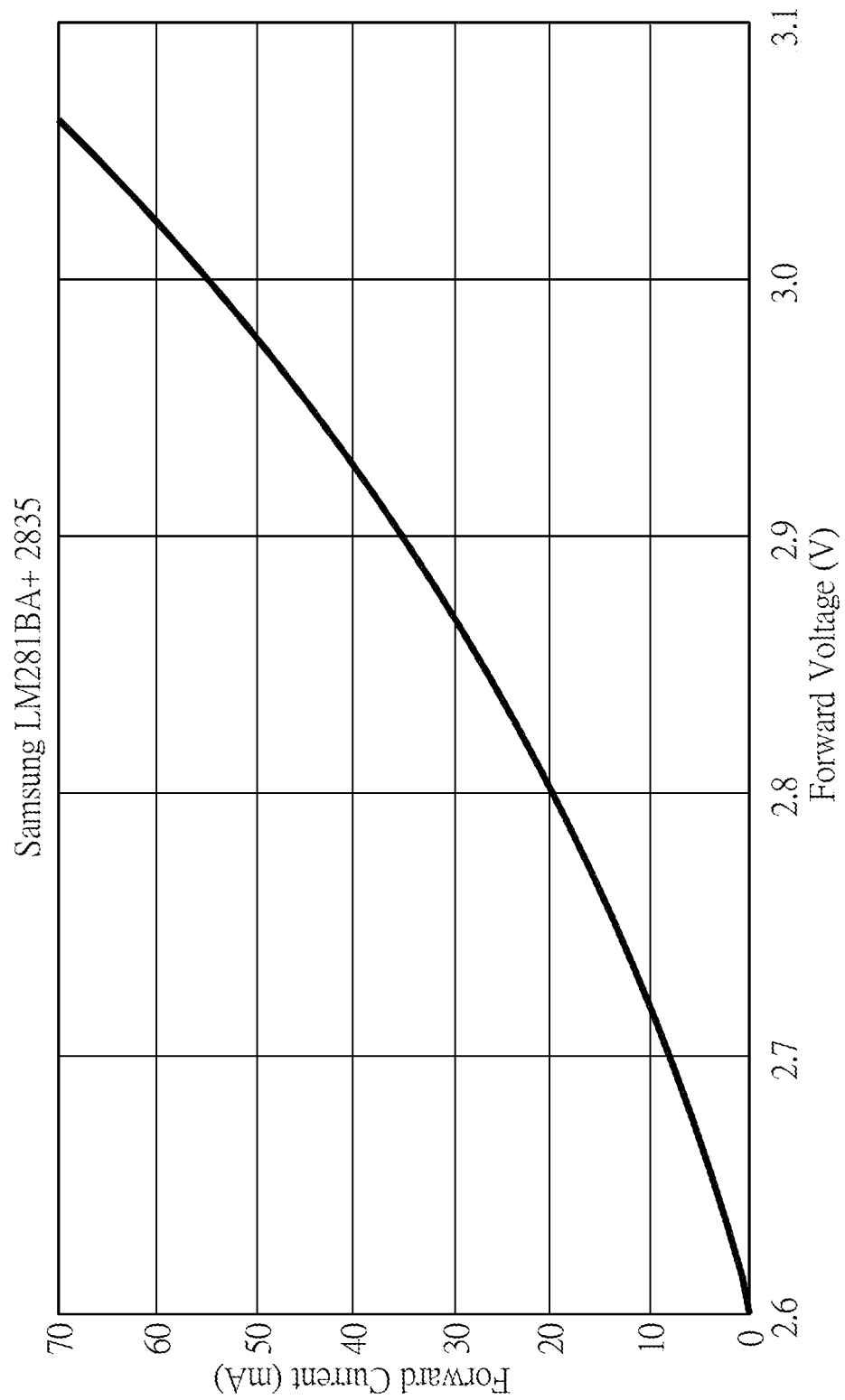
Figure 8D:
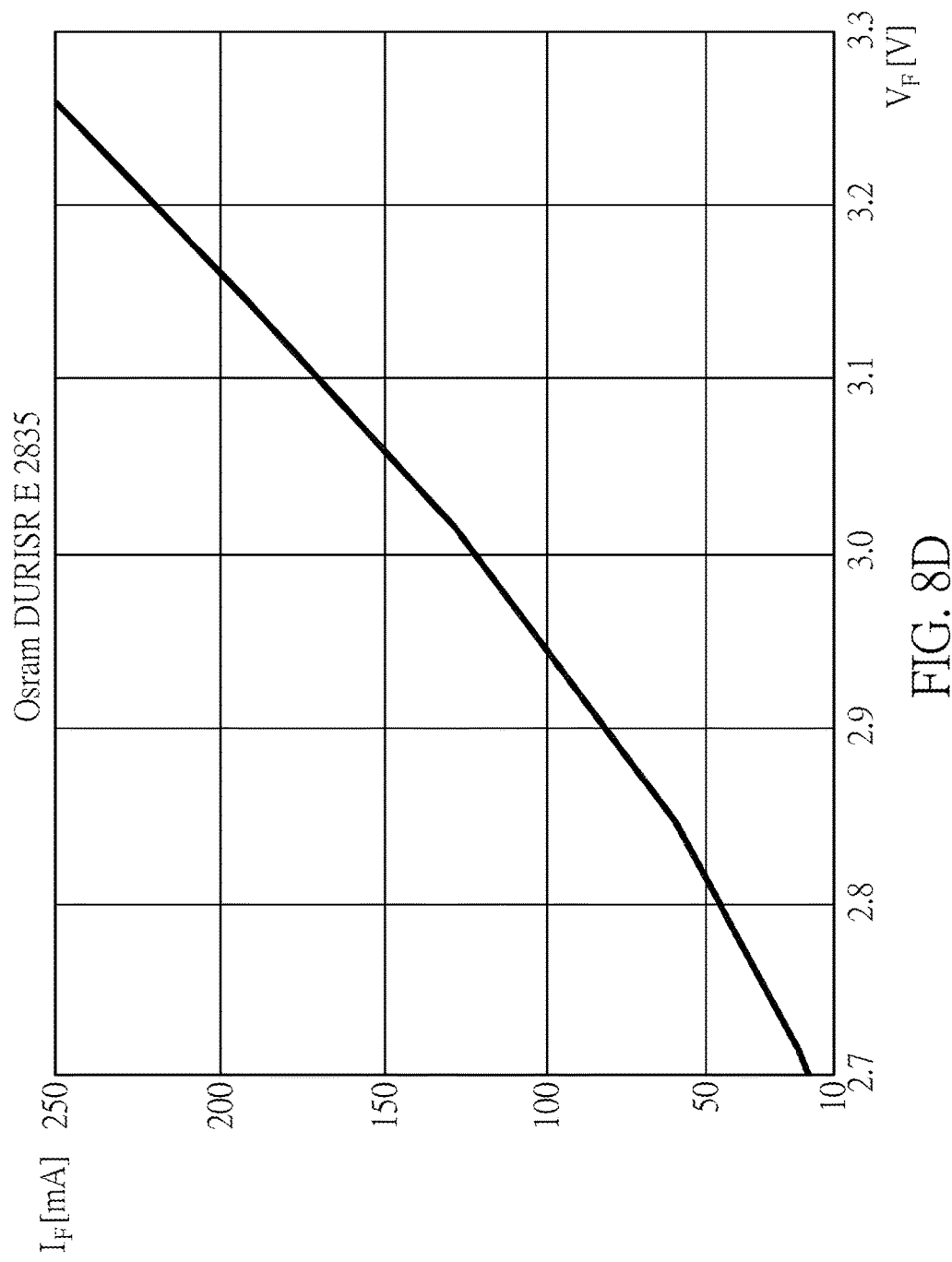

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

When the light source of the light emitting unit 150 is confined to the use of an LED load, the compliance and satisfaction of an operating constraint attributable to the unique electrical characteristics of the LED load is vital to a successful performance of an LED lighting device. Any LED lighting device failing to comply with the operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light or blue light LED there exists a very narrow voltage domain ranging from a minimum threshold voltage at 2.5 volts to a maximum working voltage at 3.3 volts, which allows to operate adequately and safely the LED; in other words, when a forward voltage imposed on the LED is lower than the minimum threshold voltage, the LED is not conducted and therefore no light is emitted, when the forward voltage exceeds the maximum working voltage, the heat generated by a forward current could start damaging the construction of the LED. Therefore, the forward voltage imposed on the LED is required to operate between the minimum threshold voltage and the maximum working voltage. In respect to the LED load of the light-emitting unit 150, the cut-in voltage $V_t$ of ACLEDs is technically also referred to as a minimum threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a minimum threshold voltage $V_{th}$ required to trigger the LED to start emitting light and the third electrical characteristic is a maximum working voltage $V_{max}$ allowed to impose on the LED to avoid a thermal runaway to damage or burn out the semiconductor construction of the LED. The described cut-in voltage $V_t$ has the same meaning as the above mentioned minimum threshold voltage $V_{th}$ which is a more general term to be used for describing the second electrical characteristic of a PN junction semiconductor structure. Also because the cut-in voltage $V_t$ is specifically tied to forming a formula to transform the minimum threshold voltage into a corresponding time phase of AC power for lighting control, it is necessary to use the term $V_{al}$ as a neutral word for describing the LED electrical characteristics to avoid being confused with the specific application for ACLED alone. Additionally, it is to be clarified that the term $V_m$ is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. For each LED chip designed with a different level of wattage specification there always exists a narrow voltage domain $V_{th} < V < V_{max}$, wherein $V_{th}$ is the minimum threshold voltage to enable the LED chip to start emitting light and $V_{max}$ is the maximum working voltage allowed to impose on the LED chip to protect the LED chip from being damaged or burned out by the heat generated by a higher working voltage exceeding $V_{max}$.

For an LED load configured with a plurality of the LED chips in any LED lighting device, regardless such LED load being configured with ACLED chips or DC LED chips, the working voltage of each single LED chip is required to operate in a domain between a minimum threshold voltage $V_{th}$ and a maximum working voltage $V_{max}$ or $V_{th}<V<V_{max}$ and the working voltage of the LED load comprising N pieces of LED chips connected in series is therefore required to operate in a domain established by a minimum threshold voltage $N \times V_{th}$ and a maximum working voltage $N \times V_{max}$ or $N \times V_{th}<V<N \times V_{max}$ wherein N is the number of the LED chips electrically connected in series. For any LED lighting device comprising an LED load it is required that the LED load in conjunction with an adequate level of power source is configured with a combination of in series and in parallel connections of LED chips such that the electric current passing through each LED chip of the LED load remains at an adequate level such that a voltage V across each LED chip complies with an operating constraint of $V_{th}<V<V_{max}$ featuring electrical characteristics of the LED chip or a voltage V across the LED load configured with N number of LED chips connected in series complies with an operating constraint of $N \times V_{th}<V<N \times V_{max}$. Such narrow operating range therefore posts an engineering challenge for a circuit designer to successfully design an adequate level of power source and a reliable circuitry configured with an adequate combination of in series connection and in parallel connection of LED chips for operating a higher power LED security light.

FIGS. 8A, 8B, 8C and 8D comprises 4 drawings schematically and respectively showing a V-I relationship chart (Forward Current vs. Forward Voltage) for a white light LED chip from each of 4 different LED manufacturers; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.3 volts the current I becomes 250 mA which generates a heat that could start damaging the PN junction of the LED chip. The minimum forward voltage (the minimum threshold voltage or cut-in voltage) and the maximum forward voltage are readily available in the specification sheets at each of LED manufacturers, such as Cree, Lumileds, Samsung, Osram, and etc. Different LED manufacturers may have slightly different figures due to manufacturing process but the deviations of differences are negligible. The constraints of minimum forward voltage and maximum forward voltage represent physical properties inherent in any solid state light source. They are necessary matter for configuring any LED lighting products to ensure a normal performance of an LED load.

FIG. 9 is a data sheet showing data of the minimum forward voltages and maximum forward voltages collected from various LED manufacturers. They are fundamental requirements for configuring any LED lighting control devices to ensure a successful performance of any LED lighting device.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers.

The compliance of the operating constraint $V_{th}<V<V_{max}$ is a necessary matter for any LED lighting device though it is not an obvious matter as it requires complicated technologies to calculate and coordinate among an adequate level of power source, a control circuitry- and a non-linear light emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer (Light of America) for marketing deceptive LED lamps and making false claims with respect to the life time of their LED lamps and a huge amount of monetary relief was claimed with the Court in the complaint.

The present disclosure of a two-level LED security light provides a unique life-style lighting solution. The motivation of creating such life-style lighting solution has less to do with the energy saving aspect of the low level illumination mode because LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the life-style lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident. These two innovative functions coupled with the motion sensor to increase illumination when people enters into the short detection area makes the present invention a perfect life-style lighting solution for enjoying an exquisite taste of evening life.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A life-style LED security light, comprising:
a power supply unit;
a light-emitting unit, including an LED load configured with a plurality of LEDs;
a loading and power control unit;
a light sensing control unit;
a motion sensing unit, including at least one motion sensor; and
a time setting unit;
wherein the loading and power control unit comprises a controller and a switching circuitry, and the controller is electrically coupled with the switching circuitry;
wherein the switching circuitry is electrically coupled between a power source of the power supply unit and the light-emitting unit;
wherein the switching circuitry comprises at least one unidirectional semiconductor switching device;
wherein the controller outputs control signals to control the switching circuitry for delivering different average electric currents from the power supply unit to drive the LED load of the light-emitting unit such that the light-emitting unit respectively generates illuminations of different light intensities for performing different illumination modes activated by the light sensing control unit, the motion sensing unit and the time setting unit;
wherein at dusk when an ambient light detected by the light sensing control unit is lower than a first predetermined value, the light-emitting unit is turned on by the loading and power control unit activated by the light sensing control unit to perform a first illumination mode with a first level illumination and with the motion sensing unit being deactivated, and the first illumination mode continues for a first predetermined time duration;
wherein upon a maturity of the first predetermined time duration the loading and power control unit manages to decrease the average electric current delivered to the LED load of the light-emitting unit to perform a second illumination mode with a second level illumination for a second predetermined time duration, and at the same time the motion sensing unit is activated;
wherein when a motion signal is detected by the motion sensing unit, the loading and power control unit manages to increase the average electric current delivered to the LED load of the light-emitting unit to perform a third illumination mode with a third level illumination for a third predetermined time duration before being switched back to the second illumination mode;
wherein at dawn when the ambient light detected by the light sensing control unit is higher than a second predetermined value, the loading and power control unit manages to switch off the light-emitting unit;
wherein the light intensity of the third illumination mode is higher than the light intensity of the second illumination mode;
wherein the time setting unit is used for adjusting and setting at least a time length of at least one of the first predetermined time duration, the second predetermined time duration and the third predetermined time duration;
wherein the power supply unit is an AC/DC power converter to convert AC power into DC power for operating the life-style LED security light, wherein the power source is a DC power from the power supply unit;
wherein the LED load in conjunction with the power source from the power supply unit is configured with an adequate combination of in series and in parallel connections of LEDs such that an electric current passing through each LED of the LED load remains at an adequate level, and a voltage V across each LED complies with an operating constraint of $V_{th}<V<V_{max}$ featuring electrical characteristics of the LED load;
wherein $V_{th}$ is a threshold voltage required to trigger each LED to start emitting light and $V_{max}$ is a maximum voltage across each LED to avoid a thermal damage to the LED construction; and
wherein the controller comprises at least a programmable integrated circuit device or an application specific integrated circuit.

2. The life-style LED security light according to claim 1, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

3. The life-style LED security light according to claim 1, wherein the control signals are pulse width modulation (PWM) signals.

4. The life-style LED security light according to claim 1, wherein the first predetermined time duration is programmable by the time setting unit.

5. The life-style LED security light according to claim 1, wherein the light intensity of the first illumination mode is adjustable by an external control unit.

6. The life-style LED security light according to claim 1, wherein the time length of the second predetermined duration is set to end at dawn activated by the light sensing control unit.

7. The life-style LED security light according to claim 1, wherein the second predetermined duration is programmable by the time setting unit.

8. The life-style LED security light according to claim 1, wherein the light intensity of the second illumination mode is adjustable by an external control unit.

9. The life-style LED security light according to claim 1, wherein the motion sensor is a passive infrared sensor.

10. The life-style LED security light according to claim 1, wherein the motion sensor is a microwave motion sensor or an ultrasonic motion sensor.

11. A life-style LED security light, comprising:
a power supply unit;
a light-emitting unit, including an LED load configured with a plurality of LEDs;
a loading and power control unit;
a light sensing control unit;
a motion sensing unit, including at least one motion sensor; and
a time setting unit;
wherein the loading and power control unit comprises a controller and a switching circuitry, and the controller is electrically coupled with the switching circuitry;

wherein the switching circuitry is electrically coupled between a power source of the power supply unit and the light-emitting unit;

wherein the switching circuitry comprises at least one unidirectional semiconductor switching device;

wherein the controller outputs control signals to control the switching circuitry for delivering different average electric currents from the power supply unit to drive the LED load of the light-emitting unit such that the light-emitting unit respectively generates illuminations of different light intensities for performing different illumination modes activated by the light sensing control unit, the motion sensing unit and the time setting unit;

wherein at dusk when an ambient light detected by the light sensing control unit is lower than a first predetermined value, the light-emitting unit is turned on by the loading and power control unit activated by the light sensing control unit to perform a first illumination mode with a first level illumination and with the motion sensing unit being in a deactivated state, and the first illumination mode continues for a first predetermined time duration;

wherein upon a maturity of the first predetermined time duration the loading and power control unit manages to cutoff the average electric current delivered to the LED load of the light-emitting unit and at the same time the motion sensing unit is activated;

wherein when a motion signal is detected by the motion sensing unit, the loading and power control unit manages to deliver the average electric current to the LED load of the light-emitting unit to perform a second illumination mode with a second level illumination for a second predetermined time duration before being switched back to the turned off state;

wherein at dawn when the ambient light detected by the light sensing control unit is higher than a second predetermined value, the light-emitting unit is switched off by the loading and power control unit;

wherein the time setting unit is used for adjusting and setting at least a time length of at least one of the first predetermined time duration and the second predetermined time duration;

wherein the power supply unit is an AC/DC power converter to convert AC power into DC power for operating the life-style LED security light, wherein the power source is a DC power from the power supply unit;

wherein the LED load in conjunction with the power source from the power supply unit is designed with an adequate combination of in series and in parallel connections of LEDs such that an electric current passing through each LED of the LED load remains at an adequate level, and a voltage V across each LED complies with an operating constraint of $V_{th}<V<V_{max}$ featuring electrical characteristics of the LED;

wherein $V_{th}$ is a threshold voltage required to trigger each LED to start emitting light and $V_{max}$ is a maximum voltage across each LED to avoid a thermal damage to LED construction; and wherein the controller comprises at least a programmable integrated circuit device or an application specific integrated circuit.

12. The life-style LED security light according to claim 11, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

13. The life-style LED security light according to claim 11, wherein the control signals are pulse width modulation (PWM) signals.

14. The life-style LED security light according to claim 11, wherein the time length of the first predetermined time duration is programmable by the time setting unit.

15. The life-style LED security light according to claim 11, wherein the light intensity of the first illumination mode is adjustable by an external control unit.

16. The life-style LED security light according to claim 11, wherein the time length of the second predetermined time duration is programmable by the time setting unit.

17. The life-style LED security light according to claim 11, wherein the light intensity of the second illumination mode is adjustable by an external control unit.

18. The life-style LED security light according to claim 11, wherein the motion sensor is a passive infrared sensor.

19. The life-style LED security light according to claim 11, wherein the motion sensor is a microwave motion sensor or an ultrasonic motion sensor.

20. A life-style LED security light, comprising:
a power supply unit;
a light-emitting unit, including an LED load configured with a plurality of LEDs;
a loading and power control unit;
a light sensing control unit;
a motion sensing unit, including at least one motion sensor; and
a time setting unit;
wherein the loading and power control unit comprises a controller and a switching circuitry, and the controller is electrically coupled with the switching circuitry;
wherein the switching circuitry is electrically coupled between a power source of the power supply unit and the light-emitting unit;
wherein the switching circuitry comprises at least one unidirectional semiconductor switching device;
wherein the controller outputs control signals to control the switching circuitry for delivering different average electric currents from the power supply unit to drive the LED load of the light-emitting unit such that the light-emitting unit respectively generates illuminations of different light intensities for performing different illumination modes activated by the light sensing control unit, the motion sensing unit and the time setting unit;
wherein at dusk when an ambient light detected by the light sensing control unit is lower than a first predetermined value, the loading and power control unit operates to turn on the light emitting unit to perform a low level illumination mode comprising at least a first level illumination for a first predetermined time duration;
wherein during the performance of the low level illumination mode, the low level illumination creates two life-style innovations for performing a life-style lighting solution, wherein a first innovation is the creation of an aesthetic night scene when people are outside of a detection area of the motion sensor, wherein a second innovation is the creation of a navigation capacity similar to a light house for guiding people to safely walk to a destination in an outdoor living area;

wherein when a motion signal is detected by the motion sensing unit, the loading and power control unit operates to increase the average electric current delivered to the LED load of the light-emitting unit to perform a high level illumination mode for a preset time period before being switched back to the low level illumination mode;

wherein the light intensity of the high level illumination mode is higher than the light intensity of the low level illumination mode;

wherein at dawn when the ambient light detected by the light sensing control unit is higher than a second predetermined value, the light-emitting unit is switched off by the loading and power control unit;

wherein the time setting unit is used for adjusting and setting at least a time length of at least one of the first predetermined time duration of the low level illumination mode and the preset time period of the high level illumination mode;

wherein the power supply unit is an AC/DC power converter to convert AC power into DC power for operating the life-style LED security light, wherein the power source is a DC power from the power supply unit;

wherein the LED load in conjunction with an adequate level of the power source is designed with an adequate combination of in series and in parallel connections of LEDs such that an electric current passing through each LED of the LED load remains at an adequate level, and a voltage V across each LED complies with an operating constraint of $V_{th} < V < V_{max}$ featuring electrical characteristics of the LED;

wherein $V_{th}$ is a threshold voltage required to trigger each LED to start emitting light and $V_{max}$ is a maximum voltage across each LED to avoid a thermal damage to LED construction; and wherein the controller comprises at least a programmable integrated circuit device or an application specific integrated circuit.

21. The life-style LED security light according to claim 20, wherein the low level illumination mode further comprises a second level illumination;

wherein upon a maturity of the first predetermined time duration, the loading and power control unit operates to further reduce the light intensity of the low level illumination mode to perform the second level illumination to end at dawn activated by the light sensing control unit.

22. The life-style LED security light according to claim 21, wherein the light intensity of the second level illumination is set at zero.

23. The life-style LED security light according to claim 21, wherein the maturity of the first predetermined time duration is set to end at a midnight time point.

24. The life-style LED security light according to claim 20, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

25. The life-style LED security light according to claim 20, wherein the control signals are pulse width modulation (PWM) signals.

26. The life-style LED security light according to claim 20, wherein the motion sensor is a passive infrared sensor.

27. The life-style LED security light according to claim 20, wherein the motion sensor is a microwave motion sensor or an ultrasonic motion sensor.

28. The life-style LED security light according to claim 20, wherein the time length of the low level illumination mode is set to end at dawn activated by the light sensing control unit.

29. The life-style LED security light according to claim 20, wherein the first predetermined time duration is programmable by the time setting unit.

30. The life-style LED security light according to claim 20, wherein the time length of the preset time period is programmable by the time setting unit.

31. An LED security light, comprising:
a power supply unit;
a light-emitting unit, including an LED load configured with a plurality of LEDs;
a loading and power control unit;
a light sensing control unit;
a motion sensing unit, including at least one motion sensor; and
a time setting unit;
wherein the loading and power control unit comprises a controller and a switching circuitry, and the controller is electrically coupled with the switching circuitry;
wherein the switching circuitry is electrically coupled between a power source of the power supply unit and the light-emitting unit;
wherein the switching circuitry comprises at least one unidirectional semiconductor switching device;
wherein the controller outputs control signals to control the switching circuitry for delivering different average electric currents from the power supply unit to drive the LED load of the light-emitting unit such that the light-emitting unit respectively generates illuminations of different light intensities for performing different illumination modes for respective predetermined time durations activated by the light sensing control unit, the motion sensing unit and the time setting unit;
wherein the time setting unit is used for adjusting and setting at least a time length of the predetermined time durations;
wherein the power supply unit is an AC/DC power converter to convert AC power into DC power for operating the life-style LED security light, wherein the power source is a DC power from the power supply unit;
wherein the LED load in conjunction with an adequate level of the power source is designed with an adequate combination of in series and in parallel connections of LEDs such that an electric current passing through each LED of the LED load remains at an adequate level, and a voltage V across each LED complies with an operating constraint of $V_{th} < V < V_{max}$ featuring electrical characteristics of the LED;
wherein $V_{th}$ is a threshold voltage required to trigger each LED to start emitting light and $V_{max}$ is a maximum voltage across each LED to avoid a thermal damage to LED construction; and
wherein the controller comprises at least a programmable integrated circuit device or an application specific integrated circuit.

32. The life-style LED security light according to claim 31, wherein at dusk when an ambient light detected by the light sensing control unit is lower than a first predetermined value, the loading and power control unit operates to switch on the light-emitting unit;

wherein when a motion signal is detected by the motion sensing unit, the loading and power control unit manages to turn on the light-emitting unit thru a soft on process, wherein the controller successively outputs a series of control signals to gradually increase the average electric current to drive the LED load of the light-emitting unit to generate a high level illumination, and the high level illumination continues for a predetermined time duration;

wherein when the ambient light detected by the light sensing control unit is higher than a second predetermined value, the light-emitting unit is turned off by the controller.

33. The life-style LED security light according to claim 31, wherein at dusk when an ambient light detected by the light sensing control unit is lower than a first predetermined value, the loading and power control unit operates to switch on the light-emitting unit;

wherein when a motion signal is detected by the motion sensing unit, the loading and power control unit manages to turn on the light-emitting unit to generate a high level illumination, the high level illumination continues for a predetermined time duration before the loading and power control unit manages to reduce illumination intensity of the light-emitting unit thru a soft off process, wherein the controller successively outputs a series of control signals to gradually decrease the average electric current to drive the LED load of the light-emitting unit such that the illumination intensity of the light-emitting unit is gradually reduced.

34. The life-style LED security light according to claim 31, wherein at dusk when an ambient light detected by the light sensing control unit is lower than a first predetermined value, the light-emitting unit is switched on by the loading and power control unit;

wherein when a motion signal is detected by the motion sensing unit, the loading and power control unit manages to turn on the light-emitting unit to perform a high level illumination for a predetermined time duration, wherein upon a maturity of the predetermined time duration the loading and power control unit manages to turn off the light-emitting unit that a soft off process, wherein the soft off process is designed with a two-stage approach;

wherein for the first stage of the soft off process, the loading and power control unit manages to instantly reduce the illumination level of the light-emitting unit to a low level illumination and continues the low level illumination for a first short time interval, wherein for the second stage of the soft off process the loading and power control unit operates to turn off the light-emitting unit.

35. The life-style LED security light according to claim 34, wherein for the second stage of the soft off process the loading and power control unit operates to gradually turn off the illumination of the light-emitting unit over a second short time interval.

36. The life-style LED security light according to claim 34, wherein during the soft off process if a new motion signal is further detected by the motion sensing unit indicating an occupant remaining in the detection area, the loading and power control unit instantly operates to restart a new cycle of the high level illumination for a new predetermined time duration;

wherein during the soft off a process if no further motion signal is received indicating the detection area is unoccupied, the light-emitting unit is thereby successfully turned, off.

37. The life-style LED security light according to claim 36, wherein the new predetermined time duration is equal to the predetermined time duration used prior to restarting the new cycle of the high level illumination.

38. The life-style LED security light according to claim 36, wherein the new predetermined time duration is programmed to be longer than the predetermined time duration used prior to restarting the new cycle of the high level illumination according to a programmed combination of increasing delay times.

39. The life-style LED security light according to claim 31, wherein at dusk when an ambient light detected by the light sensing control unit is lower than a first predetermined value, the light-emitting unit is switched on by the loading and power control unit;

wherein when a motion signal is detected by the motion sensing unit, the loading and power control unit manages to turn on the light-emitting unit to perform a high level illumination for a predetermined time duration, and upon a maturity of the predetermined time duration the loading and power control unit manages to turn off the light-emitting unit with a two-stage shutoff process;

wherein for the first stage of the shutoff process, the loading and power control unit manages to perform a sudden disruption of illumination for a short moment and resume instantly back to the high level illumination to continue for a first short time interval, wherein for the second stage of the shutoff process the loading and power control unit operates to gradually turn off the light-emitting unit over a second short time interval.

40. The life-style LED security light according to claim 39, wherein during the two-stage shutoff process if a new motion signal is further detected by the motion sensing unit indicating an occupant remaining in the detection area, the loading and power control unit instantly manages to resume the high level illumination and restarts a new cycle of the high level illumination for a new predetermined time duration;

wherein during the two-stage shutoff process if no further motion signal is received indicating the detection area is unoccupied, the light-emitting unit is thereby successfully turned off.

41. The life-style LED security light according to claim 40, wherein the time length of the new predetermined time duration is equal to the time length of the predetermined time duration.

42. The life-style LED security light according to claim 40, wherein the time length of the new predetermined time duration is longer than the time length of the predetermined time duration according to a programmed combination of increasing delay times.

43. The life-style LED security light according to claim 31, wherein at dusk when an ambient light detected by the light sensing control unit is lower than a first predetermined value, the light-emitting unit is switched on by the loading and power control unit to generate a low level illumination;

wherein when a motion signal is detected by the motion sensing unit, the loading and power control unit manages to increase the average electric current from the power source to the LED load of the light-emitting unit to generate a high level illumination for a predetermined time duration, wherein upon a maturity of the predetermined time duration the loading and power control unit manages the light-emitting unit to resume the low level illumination, wherein if a new motion signal is further detected by the motion sensing unit within a short predetermined time interval after the light-emitting unit being switched back to the low level illumination, the loading and power control unit instantly manages to resume the high level illumination and restart a new cycle of illumination for a new predetermined time duration, wherein the time length of the new predetermined time duration is longer than the time length of the predetermined time duration according to a programmed combination of increasing delay times.

44. The life-style LED security light according to claim 31, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

45. The life-style LED security light according to claim 31, wherein the control signals are pulse width modulation (PWM) signals.

46. The life-style LED security light according to claim 31, wherein the motion sensor is a passive infrared sensor.

47. The life-style LED security light according to claim 31, wherein the motion sensor is a microwave motion sensor or an ultrasonic motion sensor.

48. An LED security light, comprising:
a power supply unit;
a light-emitting unit, including an LED load configured with a plurality of LEDs;
a loading and power control unit;
a light sensing and control unit; and
a time setting unit;
wherein the loading and power control unit comprises a controller and a switching circuitry, wherein the controller is electrically coupled with the switching circuitry, wherein the switching circuitry is electrically coupled between a power source of the power supply unit and the light-emitting unit;
wherein with the switching circuitry the light-emitting unit is turned on or turned off by the loading and power control unit, and the switching circuitry comprises at least one unidirectional semiconductor switching device;
wherein the controller outputs control signals to control the switching circuitry for delivering different average electric currents from the power supply unit to drive the LED load of the light-emitting unit such that the light-emitting unit respectively generates illuminations of different light intensities for performing different illumination modes activated by the light sensing control unit and the time setting unit;
wherein at dusk when an ambient light detected by the light sensing control unit is lower than a first predetermined value, the light-emitting unit is turned on by the loading and power control unit to perform a first illumination mode for a predetermined time duration set by the time setting unit, and then the controller manages to change the lighting performance of the LED security light from the first illumination mode to a second illumination mode;
wherein the light intensity of the second illumination mode is lower than the light intensity of the first illumination mode;
wherein at dawn when the ambient light detected by the light sensing control unit is higher than a second predetermined value, the light-emitting unit is turned off by the controller;
wherein the time setting unit is used for adjusting and setting a time length of the predetermined time duration;
wherein the power supply unit is an AC/DC power converter to convert AC power into DC power for operating the LED security light, wherein the power source is a DC power from the power supply unit;
wherein the LED load in conjunction with an adequate level of the power source is designed with an adequate combination of in series and in parallel connections of LEDs such that an electric current passing through each LED of the LED load remains at an adequate level, and a voltage V across each LED complies with an operating constraint of $V_{th}<V<V_{max}$ featuring electrical characteristics of the LED;
wherein $V_{th}$ is a threshold voltage required to trigger each LED to start emitting light and $V_{max}$ is a maximum voltage across each LED to avoid a thermal damage to LED construction; and
wherein the controller comprises at least a programmable integrated circuit device or an application specific integrated circuit.

49. The LED security light according to claim 48, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

50. The LED security light according to claim 48, wherein the control signals are pulse width modulation (PWM) signals.

51. An LED security light, comprising:
a power supply unit;
a light-emitting unit, including an LED load configured with a plurality of LEDs;
a loading and power control unit; and
a light sensing control unit;
wherein the loading and power control unit comprises a controller and a switching circuitry, wherein the controller is electrically coupled with the switching circuitry, wherein the switching circuitry is electrically coupled between a power source of the power supply unit and the LED load of the light-emitting unit;
wherein the switching circuitry comprises at least one unidirectional semiconductor switching device;
wherein at dusk when an ambient light detected by the light sensing control unit is lower than a first predetermined value, the controller of the loading and power control unit outputs a control signal to conduct the switching circuitry to deliver an average electric current to the LED load to turn on the light-emitting unit for generating an illumination;
wherein at dawn when the ambient light detected by the light sensing control unit is higher than a second predetermined value, the controller of the loading and power control unit outputs a control signal to cutoff the switching circuitry to turn off the light-emitting unit;

wherein the power supply unit is an AC/DC power converter to convert AC power into DC power for operating the LED security light, wherein the power source is a DC power from the power supply unit;

wherein the LED load in conjunction with an adequate level of the power source is designed, with an adequate combination of in series and in parallel connections of LEDs such that an electric current passing through each LED of the LED load remains at an adequate level, and a voltage V across each LED complies with an operating constraint of $V_{th}<V<V_{max}$ featuring electrical characteristics of the LED;

wherein $V_{th}$ is a threshold voltage required to trigger each LED to start emitting light and $V_{max}$ is a maximum voltage across each LED to avoid a thermal damage to LED construction; and wherein the controller comprises at least an integrated circuit device programmable for generating the control signals or an application specific integrated circuit customized for generating the control signals.

52. The LED security light according to claim 51, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

53. An LED security light, comprising:
a power supply unit;
a light-emitting unit, including an LED load configured with a plurality of LEDs;
a loading and power control unit;
a light sensing control unit; and
an external control unit;
wherein the loading and power control unit comprises a controller and a switching circuitry, wherein the controller is electrically coupled with the switching circuitry, wherein the switching circuitry is electrically coupled between a power source of the power supply unit and the LED load of the light-emitting unit;
wherein the switching circuitry comprises at least one unidirectional semiconductor switching device, wherein the controller outputs control signals to control the switching circuitry for delivering different average electric currents from the power supply unit to drive the LED load of the light-emitting unit such that the light-emitting unit respectively generates illuminations of different light intensities for performing at least a first illumination mode and a second illumination mode activated by the light sensing control unit and the external control unit;
wherein the external control unit is a power interruption detection circuitry electrically coupled to the controller for detecting a short power interruption signal, wherein the controller controls the switching circuitry in response to the short power interruption signal detected to alternately switch the light-emitting unit between performing a first illumination mode and performing a second illumination mode, wherein the light intensity of the first illumination mode is higher than the light intensity of the second illumination mode;
wherein at dusk when an ambient light detected by the light sensing control unit is lower than a first predetermined value, the light-emitting unit is turned on, by the loading and power control unit to perform the first illumination mode; wherein whenever the short power interruption signal is detected by the external control unit, the controller operates to alternately switch the light-emitting unit between performing the first illumination mode and performing the second illumination mode;

wherein at dawn when the ambient light detected by the light sensing control unit is higher than a second predetermined value, the controller of the loading and power control unit operates to cutoff the switching circuitry to turn off the light-emitting unit;

wherein the power supply unit is an AC/DC power converter to convert AC power into DC power for operating the LED security light, wherein the power source is a DC power from the power supply unit;

wherein the LED load in conjunction with an adequate level of the power source is designed with an adequate combination of in series and in parallel connections of LEDs such that an electric current passing through each LED of the LED load remains at an adequate level, and a working voltage V across each LED complies with an operating constraint of $V_{th}<V<V_{max}$ featuring electrical characteristics of the LED;

wherein $V_{th}$ is a threshold voltage required to trigger each LED to start emitting light and $V_{max}$ is a maximum voltage across each LED to avoid a thermal damage to LED construction; and wherein the controller comprises at least an integrated circuit device programmable for generating the control signals or an application specific integrated circuit customized for generating the control signals.

54. The LED security light according to claim 53, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

55. An LED motion sensing security light, comprising:
a power supply unit;
a light-emitting unit, including an LED load configured with a plurality of LEDs;
a loading and power control unit;
a light sensing control unit;
a motion sensing unit, including at least one motion sensor; and
a time setting unit;
wherein the loading and power control unit comprises a controller and a switching circuitry, and the controller is electrically coupled with the switching circuitry;
wherein the switching circuitry is electrically coupled between a power source of the power supply unit and the light-emitting unit;
wherein the switching circuitry comprises at least one unidirectional semiconductor switching device;
wherein the controller outputs a control signal to control the switching circuitry for transmitting an average electric current from the power source to drive the LED load of the light-emitting unit to generate an illumination activated by the motion sensing unit for performing a motion sensing illumination mode;
wherein the power supply unit is an AC/DC power converter to convert AC power into DC power for operating the LED security light, wherein the power source is a DC power from the power supply unit;

wherein the LED load in conjunction with the power source is designed with an adequate combination of in series and in parallel connections of LEDs such that an electric current passing through each LED of the LED load remains at an adequate level, and a voltage V across each LED complies with an operating constraint of $V_{th}<V<V_{max}$ featuring electrical characteristics of the LED;

wherein $V_{th}$ is a threshold voltage required to trigger each LED to start emitting light and $V_{max}$ is a maximum voltage across each LED to avoid a thermal damage to LED construction;

wherein at dusk when an ambient light detected by the light sensing control unit is lower than a first predetermined value, the loading and power control unit operates to switch on the light-emitting unit;

wherein when a motion signal is detected by the motion sensing unit, the loading and power control unit manages to conduct the switching circuitry to deliver the average electric current to drive the LED load for generating the illumination for a predetermined time duration preset by the time setting unit;

wherein when the ambient light detected by the light sensing control unit is higher than a second predetermined value, the light-emitting unit is turned off by the controller.

56. The LED motion sensing security light according to claim 55, wherein when the LED load is configured with a plurality of LEDs or sets of LEDs electrically connected in series, a working voltage across the LED load is confined in a domain between a minimum voltage equal to the total sum of the threshold voltages of all LEDs or sets of LEDs electrically connected in series and a maximum voltage equal to the total sum of the maximum voltages of all LEDs or sets of LEDs electrically connected in series.

57. The LED security light according to claim 55, wherein the control signal is pulse width modulation (PWM) signal.

58. The LED motion sensing security light according to claim 55, wherein an external control unit is further installed and electrically coupled with the controller to receive and convert an external control signal into a message signal interpretable by the controller, wherein upon receiving the message signal the controller operates to activate a switching process to alternately perform among a high level non-motion sensing illumination mode, a low level non-motion sensing illumination mode and the motion sensing illumination mode.

59. The LED motion sensing security light according to claim 58, wherein the external control unit is a short power interruption detection circuitry and the external control signal is an short power interruption signal, wherein when a first short power interruption signal is detected, the controller operates to change the performance of the light-emitting unit from the motion sensing illumination mode to the high level non-motion sensing illumination mode, wherein when a second short power interruption signal is furthered detected, the controller operates to change the performance of the light-emitting unit from the high level non-sensing illumination mode to the low level non-sensing illumination mode, wherein when a third short power interruption signal is further detected, the controller manages to change the performance of the light-emitting unit back to the motion sensing illumination mode to complete a cycle of the switching process.

60. The LED motion sensing security light according to claim 55, wherein an external control unit is further installed and electrically coupled with the controller to receive and convert an external control signal into a message signal interpretable by the controller, wherein upon receiving the message signal the controller operates to activate a switching process to alternately perform between a low level non-motion sensing illumination mode and the motion sensing illumination mode.

61. The LED motion sensing security light according to claim 60, wherein the external control unit is a short power interruption detection circuitry and the external control signal is a short power interruption signal, wherein when a first short power interruption signal is detected, the controller operates to change the performance of the light-emitting unit from the motion sensing illumination mode to the low level non-motion sensing illumination mode, wherein when a second short power interruption signal is furthered detected, the controller operates to change the performance of the light-emitting unit from the low level non-sensing illumination mode back to the motion sensing illumination mode to complete a cycle of the switching process.

* * * * *